United States Patent [19]
Ayala

[11] Patent Number: 5,188,811
[45] Date of Patent: Feb. 23, 1993

[54] MOLYBDENUM-BASED ADDITIVES TO MIXED-METAL OXIDES FOR USE IN HOT GAS CLEANUP SORBENTS FOR THE CATALYTIC DECOMPOSITION OF AMMONIA IN COAL GASES

[75] Inventor: Raul E. Ayala, Clifton Park, N.Y.

[73] Assignee: General Electric Company, Schenectady, N.Y.

[21] Appl. No.: 841,947

[22] Filed: Feb. 26, 1992

[51] Int. Cl.$^5$ ...................... C01B 15/16; C01B 31/20
[52] U.S. Cl. .................................... 423/230; 423/237
[58] Field of Search ................... 423/237, 244 R, 230

[56] References Cited

U.S. PATENT DOCUMENTS

| | | | |
|---|---|---|---|
| 3,045,522 | 9/1991 | Kidd | 423/230 |
| 4,081,510 | 3/1978 | Kato et al. | 423/237 |
| 4,599,161 | 7/1986 | Scinta et al. | 423/244 |
| 4,725,415 | 2/1988 | Kidd | 423/230 |

Primary Examiner—Gregory A. Heller
Attorney, Agent, or Firm—James R. McDaniel; Paul R. Webb, II

[57] ABSTRACT

This invention relates to additives to mixed-metal oxides that act simultaneously as sorbents and catalysts in cleanup systems for hot coal gases. Such additives of this type, generally, act as a sorbent to remove sulfur from the coal gases while substantially simultaneously, catalytically decomposing appreciable amounts of ammonia from the coal gases.

5 Claims, No Drawings

MOLYBDENUM-BASED ADDITIVES TO MIXED-METAL OXIDES FOR USE IN HOT GAS CLEANUP SORBENTS FOR THE CATALYTIC DECOMPOSITION OF AMMONIA IN COAL GASES

BACKGROUND OF THE INVENTION

1. Field of the Invention

This invention relates to additives to mixed metal-oxides that act simultaneously as sorbents and catalysts in cleanup systems for hot coal gases. Such additives of this type, generally, act as a sorbent to remove sulfur from the coal gases while substantially simultaneously, catalytically decomposing appreciable amounts of ammonia from the coal gases.

2. Description of the Related Art

Contaminants normally found in coal gases, typically, include sulfur species (hydrogen sulfide and sulfur carbonyl), ammonia ($NH_3$), alkali metals, and tars. The primary focus of hot gas cleanup systems in the past has been the removal of the sulfur species by absorption on a sorbent because sulfur species are precursors of acid rain. The leading sorbent candidates for sulfur absorption are currently mixed-metal oxides, such as, zinc ferrite and zinc titanate. However, no significant advances have been made in the development of high-temperature $NH_3$ decomposition processes that operate at the same conditions as those for high-temperature desulfurization.

Typically, coal gas contains $NH_3$ at concentrations up to 7000 ppmv. Removal of $NH_3$ from coal gases is a problem that has been gaining importance in recent years since ammonia is a precursor for $NO_x$ formation during combustion. Recently, there has been an emphasis on high temperature (1000° F. or higher) removal of $NH_3$.

Exemplary of such prior art is embodied in various methods, such as sorption/reaction with solids and reaction of $NH_3$ with other gases. This work has identified catalytic decomposition as one of the viable methods for $NH_3$ removal at high temperature. During this prior work, several catalysts of varying metal compositions were tested, including nickel-, iridium-, and manganese-supported catalysts that were fairly effective at 800° C.(1472° F.), depending on coal gas composition. However, none of these active catalysts maintained reactivity upon sulfur poisoning or were active at lower temperatures, 1000°-1100° F., which are typical absorption temperatures for zinc ferrite/zinc titanate desulfurization systems. Also, the use of molybdenum-based catalysts in the petroleum industry is widely employed for hydrocracking and methanation reactions, but they are also susceptible to sulfur poisoning. Therefore, a more advantageous system would be presented if appreciable amounts of $NH_3$ could be decomposed by a catalyst without the catalyst being adversely affected by the sulfur.

It is apparent from the above that there exists a need in the art for an additive which can be used in the cleanup of hot coal gases, and which at least equals the catalytic decomposition of ammonia characteristics of the known additives but which at the same time is also capable of simultaneously acting as a sorbent to remove sulfur from the coal gases without being significantly poisoned by the sulfur. It is a purpose of this invention to fulfill this and other needs in the art in a manner more apparent to the skilled artisan once given the following disclosure.

SUMMARY OF THE INVENTION

Generally speaking, this invention fulfills these needs by providing a method for reducing an amount of sulfur and ammonia contained in a hot coal gas using a molybdenum-based sorbent-catalyst comprising the steps of combining at least two metal oxides to form a mixed-metal oxide mixture, adding a binder to said mixed metal oxide mixture, adding a predetermined amount of a molybdenum oxide to said mixed-metal oxide mixture and said binder to create a base mixture, calcinating said base mixture, activating said base mixture, and contacting said activated base mixture with hot coal gases in order to substantially reduce the amount of sulfur and ammonia in said hot coal gases.

In certain preferred embodiments, the molybdenum oxide is molybdenum trioxide ($MoO_3$). Also, the base mixture is calcinated by heating the base mixture to approximately 1400°-1800° F. Finally, the base mixture is activated by flowing a gas containing 1% or less hydrogen sulfide ($H_2S$) at 1000° F. over the base mixture.

In another preferred embodiment, the activated sorbent-catalyst containing $MoO_3$ can simultaneously remove substantial amounts of sulfur from hot coal gases while decomposing appreciable amounts of $NH_3$ in the coal gases.

The preferred sorbent-catalyst, according to this invention, offers the following advantages: ease of production; excellent sorbent characteristics; excellent catalytic characteristics; and good stability. In fact, in many of the preferred embodiments, these factors of production, sorbent characteristics and catalytic characteristics are optimized to an extent considerably higher than heretofore achieved in prior, known sorbents or catalysts.

The above and other features of the present invention which will become more apparent as the description proceeds are best understood by considering the following detailed description.

DETAILED DESCRIPTION OF THE INVENTION

Sorbents for high-temperature desulfurization of coal gases are usually mixed-metal oxides fabricated from zinc oxide, iron oxide, and titanium dioxide, or a combination of these three with other organic/inorganic binders and metal oxides. The innovative aspect of the preparation of the sorbents is the addition of molybdenum to the ferrite and titanate sorbents. Molybdenum trioxide ($MoO_3$), or any other form of molybdenum, is added from 0 to 5% by weight to the mixed-metal oxide sorbent prior to calcination to achieve a solid phrase reaction that results in a composite solid composition of Zn, Fe, Ti, and Mo atoms. The exact composition or crystalline structure of Mo is not known. During absorption of $H_2S$ from coal gases, the Zn and Fe atoms form sulfides according to well known reactions found in the literature. Mo is also known to form sulfides, for instance,

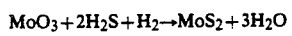

$$MoO_3 + 2H_2S + H_2 \rightarrow MoS_2 + 3H_2O$$

Based on literature data on catalytic activity of $MoO_3$ and $MoO_2$ for hydrocracking and methanation reactions, Mo may have activity towards breaking hydrogen bonds with other atoms, and hence, be able to break down the hydrogen-nitrogen bond with ammonia, according to $$NH_3 = N_2 + H_2.$$

The specific composition of the sorbent-catalyst will now be discussed with reference to the example below.

EXAMPLE 1

Zinc oxide powder and titanium dioxide powder are mixed together, preferably, in a combination of less than 3-to-1 (Zinc oxide-to-titanium dioxide). A commericially available powderized binder, such as bentonite, is also mixed with the metal oxide mixture. Finally, from 0 to 5% by weight of powderized $MoO_3$ is added to the binder/metal oxide mixture to create a base mixture. The base mixture is then formed into suitable sized pellets by any well known pellet-forming technique. It is to be understood that pellets are used because they can maintain their structural integrity during the sorbent-catalystic interaction with the hot coal gases. However, a pelletized form of the base mixture may not be needed in some sorbent/catalytic processes, such as, fluidized beds or honey-comb monoliths. The pelletized base mixture is then calcinated by subjecting the pellets to a temperature of approximately 1400°–1800° F. for at least one hour. The pelletized calcinated base mixture is activated, preferably, by subjecting the pelletized base mixture to a calcination process where a gas is passed over the base mixture by conventional gas passing techniques such that the gas contains 1% less by volume of hydrogen sulfide ($H_2S$) at approximately 1000° F. for approximately one hour. The activation process can be repeated several times, if necessary, with interim contact of the catalyst with a gaseous mixture of 1% $O_2$ in nitrogen at approximately 1000° F. for at least one hour. The activated pelletized base mixture is then placed in a flow of hot coal gases such that the amount of sulfur and $NH_3$ in the hot coal gases is substantially reduced. Tests for sulfur removal and $NH_3$ decomposition have been performed as set forth in Table 1 below.

TABLE 1

| | Catalytic Ammonia Removal | |
|---|---|---|
| CATALYST ACTIVATION | GAS COMPOSITION # | % NH3 REMOVAL |
| Zinc Titanate | 1 | 0 |
| Zinc Titanate plus 2.5% $MoO_3$: | | |
| No Activation | 1 | 0 |
| No Activation | 2 | 2 |
| After 1 Activation | 1 | 16 |
| After 1 Activation | 3 | 36 |
| After 8 Activations | 1 | 89 |

Gas Composition #1: 39.6% $H_2$, 3000 ppm $NH_3$, Balance $N_2$
Gas Composition #2: 39.6% $H_2$, 3000 ppm $NH_3$, 1% $H_2S$, Balance $N_2$
Gas Composition #3: 10% $H_2$, 3000 ppm $NH_3$, 10% $CO_2$, 10% CO, 1% $H_2S$, Balance $N_2$ All of the cases in Table 1 exhibited greater than 99% $H_2S$ removal from simulated hot coal gas. As can be seen from the table, the presence of molybdenum, or sulfided molybdenum in this case, is responsible for the enhancement of the $NH_3$ decomposition in zinc titanate. The sulfided sorbent is still active for $NH_3$ decomposition even after sulfur absorption (or sulfur poisoning, as it is called in catalysts). Most prior, supported catalysts do not tolerate even small traces (a few ppm) of sulfur before turning unreactive. The synergism between Zr, Ti, and Mo makes the combination of metals sulfur resistant.

Once given the above disclosure, many other features, modifications and improvements will become apparent to the skilled artisan. Such features, modifications and improvements are, therefore, considered to be a part of this invention, the scope of which is to be determined by the following claims.

What is claimed is:

1. A method for reducing an amount of hydrogen sulfide and ammonia in a hot coal using a molybdenum-based sorbent-catalyst, wherein said method is comprised of the steps of:
   combining at least two metal oxides in a combination of up to three parts zinc oxide to one part titanium oxide to form a mixed-metal oxide mixture;
   adding a binder to said mixed metal oxide mixture;
   adding up to 5% by weight of a molybdenum-based material to said mixed-metal oxide mixture and said binder to create a base mixture;
   calcinating said base mixture to a temperature of up to 1400°–1800° for at least one hour;
   activating said base mixture with a gas containing approximately 1% hydrogen sulfide by volume at a temperature of approximately 1000° F. for at least one hour and
   contacting said activated base mixture with hot coal gases in order to substantially reduce the amount of hydrogen sulfide and ammonia in said hot coal gases.

2. The method, according to claim 1, wherein said method is further comprised of the step of:
   forming said base mixture into pellets.

3. The method, according to claim 1, wherein said binder is further comprised of:
   bentonite.

4. The method, according to claim 1, wherein said molybdenum-based material is further comprised of:
   molybdenum trioxide.

5. The method, according to claim 1, wherein said method is further comprised of the step of:
   contacting said base mixture with a gaseous mixture of 1% $O_2$ in nitrogen at approximately 1000° F. for at least one hour.

* * * * *